Figure 1:
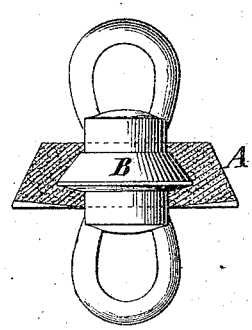
Figure 2:
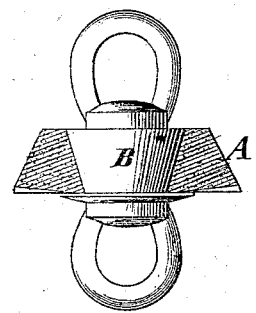
Figure 3:
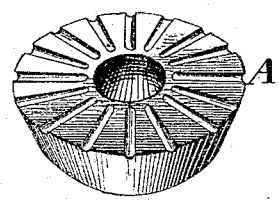

B. G. H. HATHAWAY.
Valves for Chain-Pumps.

No. 158,075. Patented Dec. 22, 1874.

Witnesses.
A. Ruppert
B. Edw. J. Eils

B. G. H. Hathaway
Inventor.
D. P. Holloway & Co
Att'y

UNITED STATES PATENT OFFICE.

BRADFORD G. H. HATHAWAY, OF ROCKSTREAM, NEW YORK.

IMPROVEMENT IN VALVES FOR CHAIN-PUMPS.

Specification forming part of Letters Patent No. 158,075, dated December 22, 1874; application filed February 13, 1874.

*To all whom it may concern:*

Be it known that I, BRADFORD G. H. HATHAWAY, of Rockstream, in the county of Yates and State of New York, have invented certain Improvements in Valves for Chain-Pumps, of which the following is a specification:

Figure I is a sectional elevation of my improved valve, showing the rubber valve, the disk of metal placed within the rubber, and the loops or rings for attaching it to a chain. Fig. II is a similar view, showing a modified form of the metal disk, with a flange on the under side of the valve; and Fig. III is a perspective view of the valve, showing the grooves in the lower surface.

Corresponding letters denote like parts in all the figures.

This invention relates to a valve or bucket for what are known as chain-pumps; and it consists, first, of a valve having a recess formed in its center for the reception of a tapering disk of metal, and having in its under surface grooves or corrugations for the discharge of water from above the same when the pump is not in use, all as will be more fully shown hereinafter.

Elastic valves, as heretofore constructed, have been subject to various objections, one of which has been that valves raising water from great depths, there was not sufficient expansibility to them to prevent their leaking around their peripheries. One of the objects of my invention is to overcome this difficulty; another being to provide a means of securely attaching the valve to its disk, and yet another to provide a suitable, yet effectual, means of discharging the water from above the valve, and thus prevent the liability of the bursting of the pipe or barrel of the pump by freezing.

In constructing valves of this character I provide a disk, A, of rubber or other suitable material, such as gutta-percha and caoutchouc, of the tapering form shown, and having in them a recess, also of tapering or conical form, for the reception of a metal disk or plate, B, of such form as to fit the cavity formed in the valve, and thus, when water is pressing upon the upper side thereof, cause it to be expanded just in proportion to the weight of the column of such water, and by this means form a more perfect fit in the pipe or barrel of the pump, which will at all times prevent leakage.

The manner of attaching the valve to the metal disk may be by pressing it thereon until the smallest portion upon the lower side thereof has passed the largest portion of the metal disk, when it will contract sufficient to cause it to remain firmly fixed, or it may be formed upon the metal disk and be vulcanized thereon.

The rings or loops shown as attached to the metal disk are designed to afford a ready means for attaching the chain which moves the valves or buckets.

The above description refers more particularly to the device shown at Fig. I, that shown in Fig. II being a modification thereof, so far as the form of the metal disk is concerned, it having a collar for the valve to rest upon, and a tapering portion, which extends all of the way through the valve. It is, however, designed to operate like the other, and is only shown as a modification thereof.

In use, this valve will be pressed or drawn into an aperture somewhat smaller than its greatest diameter, which will cause its thin edge to be turned down somewhat, and thus a greater amount of its surface will be made to bear upon the surface of the pipe or barrel through which it moves. In consequence of the fact that the weight of the column of water resting upon the valve has a tendency to increase its diameter, the valve will prevent the passage of any water past it when it is moving through the pipe or barrel; but as the grooves in its lower surface extend some distance into it, when the weight of the column is diminished it will permit the water to run out through said grooves, and thus prevent the freezing thereof in the pump, the valve being reduced in diameter as the pressure is decreased.

Having thus described my invention, what I claim, and desire to secure by Letters Patent, is—

1. A valve for a chain-pump, made of india-rubber or analogous material, recessed to receive a tapering plate of metal, and having in its under surface grooves for discharging the water from above when the pump is not in use.

2. A valve, made of rubber or other elastic material, having in its under surface grooves or corrugations, substantially as and for the purpose set forth.

In testimony whereof I have signed my name to this specification in the presence of two subscribing witnesses.

BRADFORD G. H. HATHAWAY.

Witnesses:
H. R. BARNES,
B. F. ALLEN.